(12) United States Patent
Massey et al.

(10) Patent No.: US 11,066,618 B2
(45) Date of Patent: Jul. 20, 2021

(54) ORGANIC LUBRICANT

(71) Applicant: MJ Research and Development, LP, Houston, TX (US)

(72) Inventors: Owen N. Massey, Houston, TX (US); Fred P. Massey, Houston, TX (US)

(73) Assignee: MJ RESEARCH & DEVELOPMENT, LP, Houston, TX (US)

(*) Notice: Subject to any disclaimer, the term of this patent is extended or adjusted under 35 U.S.C. 154(b) by 29 days.

(21) Appl. No.: 16/453,050

(22) Filed: Jun. 26, 2019

(65) Prior Publication Data
US 2020/0002636 A1    Jan. 2, 2020

Related U.S. Application Data

(60) Provisional application No. 62/690,628, filed on Jun. 27, 2018.

(51) Int. Cl.
*C10M 101/04* (2006.01)
*C10M 129/06* (2006.01)
(Continued)

(52) U.S. Cl.
CPC ............ *C10M 101/04* (2013.01); *C09K 8/02* (2013.01); *C10M 125/24* (2013.01); *C10M 129/06* (2013.01); *C10M 129/32* (2013.01); *C10M 2201/085* (2013.01); *C10M 2207/021* (2013.01); *C10M 2207/122* (2013.01)

(58) Field of Classification Search
CPC .......................... C10M 101/04; C10M 129/06; C10M 125/24; C10M 129/32; C10M 2207/122; C10M 2201/085; C10M 2207/021; C10M 169/00; C10M 2207/402; C10M 2207/401; C09K 8/02; C09K 2208/34; C09K 8/035; C10N 2040/252; C10N 2040/30; C10N 2030/06; C10N 2030/02; C10N 2030/52;
(Continued)

(56) References Cited

U.S. PATENT DOCUMENTS 5,773,391 A * 6/1998 Lawate .............. C10M 169/048
508/257
5,888,947 A * 3/1999 Lambert .............. C10M 159/08
508/491

(Continued)

FOREIGN PATENT DOCUMENTS

CN     107950683 A  *  4/2018
IN     200400365 I1 *  4/2009
WO    WO-2013156953 A1 * 10/2013   .............. C10L 1/026

OTHER PUBLICATIONS

"Methanolysis of Castor Oil and Parametric Optimization" Sintayehu Makuria Hailegiorgis, M Amirul Hasraff, Saleem Nawaz Khan, Mohammad Ayoub—Procedia Engineering 148 (2016) 546-552 (Year: 2016).*

(Continued)

*Primary Examiner* — Pamela H Weiss
(74) *Attorney, Agent, or Firm* — Constance Gall Rhebergen Bracewell LLP

(57) ABSTRACT

An organic lubricant composition comprising a vegetable oil; an organic acid; and an organic alcohol, where the organic lubricant composition is substantially free of inorganic compounds.

14 Claims, 1 Drawing Sheet

(51) Int. Cl.
*C10M 129/32* (2006.01)
*C09K 8/24* (2006.01)
*C10M 125/24* (2006.01)
*C09K 8/02* (2006.01)

(58) Field of Classification Search
CPC ......... C07C 67/00; C07C 67/02; C07C 67/03; C11C 3/10
See application file for complete search history.

(56) References Cited

U.S. PATENT DOCUMENTS

| | | | | |
|---|---|---|---|---|
| 7,252,779 | B2* | 8/2007 | Mosier | C07C 305/06 252/67 |
| 7,968,504 | B2 | 6/2011 | Mosier et al. | |
| 8,133,518 | B2* | 3/2012 | Han | C11C 3/08 426/417 |
| 9,598,623 | B2* | 3/2017 | Myllymaki | C08K 3/10 |
| 9,598,625 | B2 | 3/2017 | Massey et al. | |
| 10,138,406 | B2* | 11/2018 | Massey | C09K 8/035 |
| 2002/0017629 | A1* | 2/2002 | Mosier | C07F 9/143 252/71 |
| 2005/0049386 | A1* | 3/2005 | Oostveen | C09D 167/08 528/272 |
| 2008/0020956 | A1* | 1/2008 | Mosier | C07F 9/113 508/421 |
| 2011/0224121 | A1* | 9/2011 | Varineau | C11C 3/003 510/360 |
| 2012/0245371 | A1* | 9/2012 | Lourenco | C07C 29/88 554/204 |
| 2017/0152209 | A1* | 6/2017 | Lutz | C07C 69/675 |

OTHER PUBLICATIONS https://www.labmanager.com/business-management/the-seven-most-common-grades-for-chemicals-and-reagents-2655 Information on Grades of Reactants (Year: 2020).*

* cited by examiner

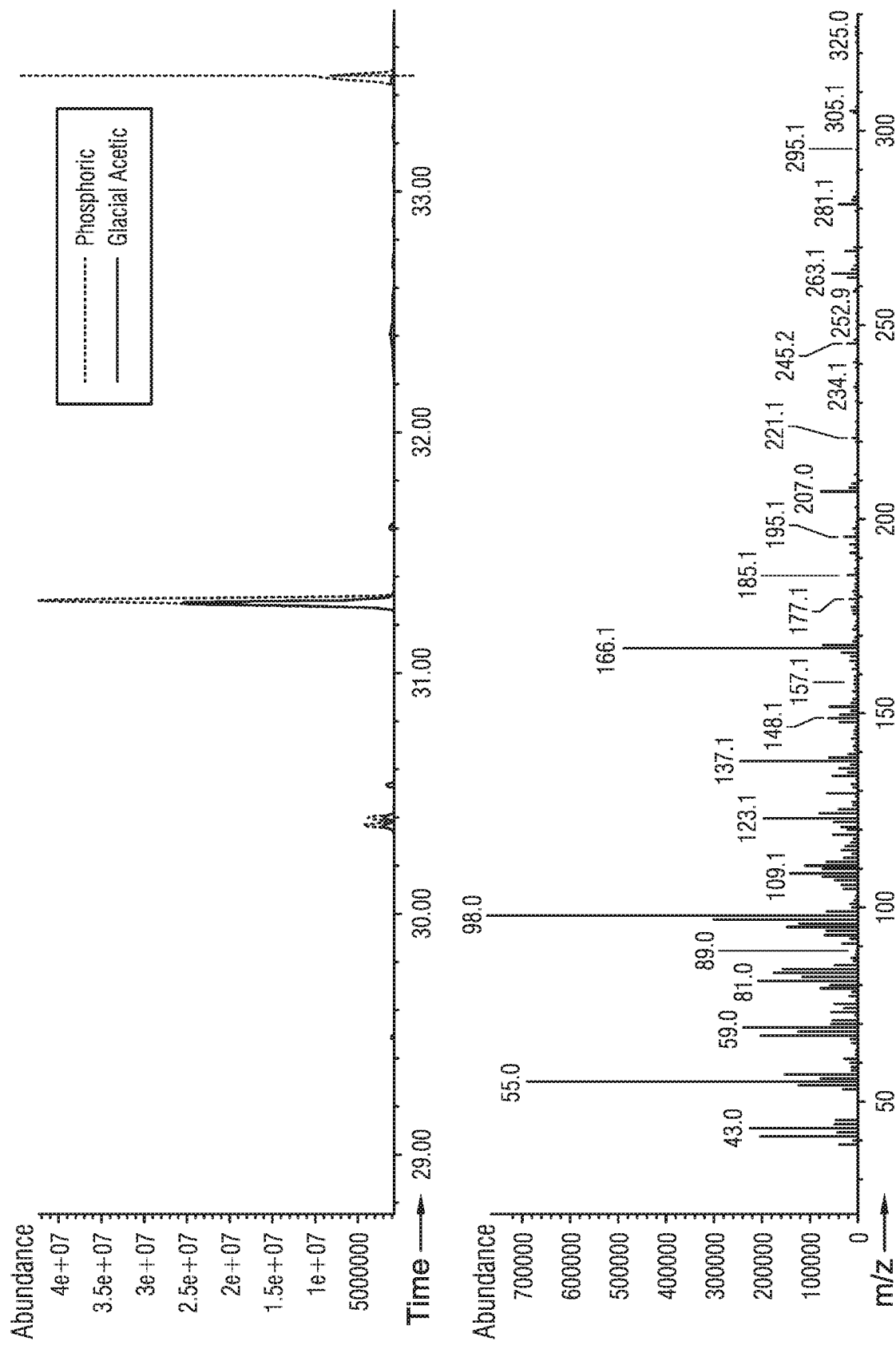

ORGANIC LUBRICANT

PRIORITY

The present application is a non-provisional application of and claims priority to and the benefit of U.S. Prov. App. No. 62/690,628, filed Jun. 27, 2018, the entire disclosure of which is incorporated here by reference.

FIELD

The present technology relates to organic lubricant compositions. In particular, the present technology relates to organic lubricant compositions for use in internal combustion engines, diesel engines, heating, ventilation, and air conditioning (HVAC) systems, and in oilfield applications, for example.

BACKGROUND

Lubricants are used in a variety of situations for reducing friction between metal parts in contact with one another, or in other situations where increased lubricity is required. Lubricants can reduce heat produced from friction between parts. While lubricants with inorganic compounds are effective in certain applications, for example under high temperatures and pressures, small amounts of inorganic deposits can form in systems where lubricants with inorganic compounds are used. For example, in diesel engines applying lubricants with inorganic compounds, deposits can form on catalytic converters, fuel pumps, injectors, and other parts of the engines over time.

However, lubricants with inorganic compounds like phosphorous are generally used for high temperature applications, and in other situations where extended lubrication performance is required. Internal combustion engines and diesel engines can suffer from "poisoning" effects of inorganic additives, for example lead, sulfur, phosphorus, zinc, calcium, and magnesium, once these components deposit on units, such as a catalytic converter. These deposits can be introduced to an engine or system by way of fuel and use of lubricants, such as engine oil.

SUMMARY

Disclosed herein is an organic lubricant composition, in some embodiments without or in the absence of or substantially in the absence of inorganic compounds. Surprising and unexpected results have been obtained in the absence of inorganic compounds, for example a significantly lower than expected total acid number, a significantly lower than expected pour point, a significantly higher than expected flash point, and improved lubricity in certain applications at least between about 8% to about 10% improved performance versus a composition containing inorganic compounds.

In embodiments of the present disclosure, one or more organic acids is applied to a lubricant composition, while inorganic acids, for example phosphoric acid, are not applied, or are applied in very small amounts up to about 5 ppm of phosphoric acid. The absence of inorganic compounds avoids the build-up of inorganic residues and deposits in systems in which the organic lubricant is applied. Surprisingly and unexpectedly, even in the absence of inorganic compounds, embodiments of the organic lubricant have improved physical properties and improved lubricity performance under conditions in which lubricants comprising inorganic compounds are typically used.

In some embodiments, for example diesel fuel applications, embodiments of the organic lubricant can be applied at between about 50 ppm to about 500 ppm to a fuel source.

Therefore, disclosed here is an organic lubricant composition comprising a vegetable oil; an organic acid; and an organic alcohol, where the organic lubricant composition is substantially free of inorganic compounds. In some embodiments, the components react to form an at least partially-transesterified fatty acid ester. In other embodiments, the vegetable oil comprises castor oil at about at least 90% by weight in the organic lubricant composition. Still in other embodiments, the organic acid comprises glacial acetic acid at about at least 0.5% by weight in the organic lubricant composition. In certain embodiments, the organic alcohol comprises n-propanol at about at least 5% by weight in the organic lubricant composition.

Still in other embodiments of the composition, the organic lubricant composition comprises less than 0.5% by weight of any inorganic compounds. Further disclosed is a method for use of the organic lubricant composition comprising the step of: applying the organic lubricant composition in a diesel fuel system at between about 50 ppm to about 500 ppm. In other methods, the organic lubricant composition is applied in a heating, ventilation, and air conditioning system. In other embodiments, the organic lubricant composition is applied in a wellbore drilling or production system. Still in other embodiments, a method for formulating an organic lubricant composition includes the steps of: mixing together a vegetable oil; an organic acid; and an organic alcohol, where the organic lubricant composition is substantially free of inorganic compounds; and allowing the vegetable oil, organic acid, and organic alcohol to react to form an at least partially-transesterified fatty acid ester.

BRIEF DESCRIPTION OF THE DRAWINGS

The present technology will be better understood on reading the following detailed description of nonlimiting embodiments thereof, and on examining the accompanying drawings. It is to be noted, however, that the drawings illustrate only several embodiments of the disclosure and are therefore not to be considered limiting of the disclosure's scope as it can admit to other equally effective embodiments.

FIG. 1 is a graph showing mass spectrometry readings for glacial acetic acid and phosphoric acid.

DETAILED DESCRIPTION OF THE EMBODIMENTS

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose.

FIG. 1 is a graph showing mass spectrometry readings for glacial acetic acid and phosphoric acid.

In some embodiments of the present invention, glacial acetic acid, an organic compound, is added to a lubricant composition where the glacial acetic acid comprises between about 0.1% by weight to about 10% by weight of the lubricant composition. Glacial acetic acid is a dewatered version of acetic acid. In some embodiments, the glacial acetic acid comprises between about 0.5% by weight to about 5% by weight of the lubricant composition. In some embodiments, the glacial acetic acid comprises between about 0.6% by weight to about 2.5% by weight of the lubricant composition. In some embodiments, the glacial acetic acid is present at about 0.6% by weight of the lubricant composition.

The remainder of the lubricant composition can comprise, for example, castor oil between about 90% by weight to about 95% by weight of the lubricant composition, for example about 94.3% by weight. The lubricant composition can further include alcohols, such as for example N-propanol, for example at about 5% by weight of the lubricant composition. Inorganic acids, for example phosphoric acid, are not applied, or are applied in very small amounts up to about 5 ppm of phosphoric acid.

Additionally disclosed are compositions and methods of lubricating wherein the lubricant additive is readily miscible in an oil-based system. Embodiments of the organic lubricant composition can provide effective lubrication in extremely low and extremely high temperature regions. Further, embodiments of the organic lubricant composition can provide useful lubrication at extremely high pressures. In some embodiments, the organic lubricant is not corrosive to metals when reducing friction and wear between surfaces. For example, the organic lubricant can be applied in internal combustion engines, diesel engines, and wellbore environments.

Embodiments of the organic lubricant composition include a transesterified fatty acid ester in addition to or alternative to a partially-transesterified fatty acid ester. To produce a transesterified fatty acid ester in addition to or alternative to a partially-transesterified fatty acid ester, a fatty acid ester is transesterified, in the presence of an acid, through reaction with a compound containing a hydroxyl functional group.

In some embodiments, the fatty acid ester has a carbon number between eight and twenty-two, inclusive. Dimers and trimers of these fatty acids are also useful. The composition that is the reaction product of the fatty acid ester reacted with the compound containing a hydroxyl functional group in the presence of an acid contains the transesterified fatty acid ester as well as other products resulting from the reaction. The fatty acid ester can be synthetic or naturally occurring. In some embodiments, the fatty acid ester includes a vegetable oil. Some of the fatty acid esters encountered in vegetable oils are ricinoleic acid, oleic acid, linoleic acid, stearic acid, lauric acid, myristic acid and palmitic acid.

In some embodiments, the organic lubricant composition includes vegetable oil, for example castor oil. Castor oil contains at least about 80 percent ricinoleic acid with about 89 percent being useful. Other fatty acid esters with a carbon number of 18 can be used. The balance of the castor oil includes other compositions. Synthetic fatty acid esters can also be used. In one embodiment where the fatty acid ester is castor oil, the resulting composition includes ricinoleic n-propyl ester as the transesterified fatty acid ester. In another embodiment using castor oil, the reaction produces an ester of ricinoleic acid and glycerol.

Ricinoleic acid is a fatty acid ester with a carbon number of eighteen that is suitable in embodiments of the present disclosure. Ricinoleic acid is the common name of the triglyceride or fatty acid ester found in various vegetable oils, particularly castor oil. Corn oil can also be applied. This can also be called ricinolein or the glyceride of ricinoleic acid. Ricinoleic acid occurs in high concentrations in castor oil. One product of reaction of castor oil includes ricinoleic propanol ester. Other fatty acid esters include oleic acid, stearic acid, lauric acid, myristic acid and palmitic acid.

Examples of various fatty acid esters include caprylic, capric, lauric, lauroleic, myristic, myristoleic, palmitic, palmitoleic, stearic, oleic, linoleic, linolenic, ricinoleic, arachidic, gadoleic, arachidonic, behenic, erucic acid and the like. All of these fatty acid esters can be useful in the current invention. Natural sources of these fatty acid esters include almond, apricot kernel, avocado, castor, coconut, corn, cottonseed, olive, peanut, rice bran, safflower, sesame, soybean, sunflower, walnut, palm, canola, linseed and the like. Fatty acid esters are beneficial in that they are nontoxic, a renewable resource and biodegradable.

The compound containing the hydroxyl functional group is preferably an alcohol having a carbon number from C1 to C18. Examples of alcohols useful in the invention include methyl alcohol, ethyl alcohol, butyl alcohol, pentyl alcohol, hexyl alcohol, heptyl alcohol, octyl alcohol, nonyl alcohol, decyl alcohol, dodecanol, iso-propyl alcohol, n-propyl alcohol, glycerol, substituted alcohols, multiple hydroxy functional group alcohols and various combinations of the same.

Also, ricinoleic acid, the most common fatty acid ester in castor oil, provides a versatile starting material for the syntheses of a lubricant system. The hydroxyl, carboxyl and double bond functionalities are sites for a variety of chemical reactions. Compositions disclosed here have characteristics that make the compositions particularly useful as a lubricant or as an additive to a lubricant. This invention includes a process for lubrication of a lubricant-dependent system with a fluid including adding an effective amount of the transesterified fatty acid ester of the invention to the lubricant-dependent system in the fluid.

With the organic lubricant composition, at less than 100 percent, the composition acts as an additive. At 100 percent, the composition of the invention is the entire working fluid. In diesel fuel applications, compositions of the present disclosure can be applied at between about 50 ppm to about 100 ppm.

There are an infinite number of systems that require lubrication. These and other systems or pieces of equipment benefiting from the use of a lubricant are referred to jointly as lubricant-dependent systems. Due to the anti-corrosive nature of the composition of the invention, this composition is compatible with all such systems.

The composition is miscible in oil-based lubricants or can act as a lubricant without additional chemical components. Examples of lubricant-dependent systems include mechanical devices, refrigeration systems, motor oil systems, engines, engine parts, gears, drilling operations, reciprocating combustion engines and the like.

The composition of the invention modifies friction properties, reduces wear and prevents galling and seizing.

EXAMPLES

Embodiments of the invention have been lab tested using lubricity meters and a high frequency reciprocating rig (HFRR), and have also been tested for corrosion properties and other physical properties. Lubricity of an organic lubricant composition containing glacial acetic acid and no inorganic compounds, including no inorganic acids, was improved between about 8% to about 10% over a lubricant composition with inorganic compounds, specifically inorganic acid.

Table 1 shows a comparison of certain physical properties for a lubricant with an inorganic compound, specifically inorganic acid containing phosphorous, and an organic acid without inorganic compounds. Test Method refers the ASTM International test standard.

| Test Parameter | Test Method | Lubricant with Inorganic Compound | Lubricant without Inorganic Compound |
|---|---|---|---|
| Gravity API (American Petroleum Institute) at 60° F. | D-287 | 16.0 | 15.8 |
| Flash point. COC (Cleveland open-cup), ° F.- | D-92 | 500 | 575 |
| Pour point, ° F. | D-97 | −30 | −45 |
| Total Acid number, Mg KOH/gm | D-974 | 10.38 | 4.07 |
| Viscosity CST at 100° C. | D-445 | 16.52 | 18.02 |
| Viscosity CST at 40° C. | D-445 | 178.21 | 219.62 |

The surprising and unexpected nature of the success of organic lubricants of the present invention using, for example, castor oil, propanol, and glacial acetic acid is that no inorganic compounds are required as is required in prior art compositions, and furthermore other tested organic acids, such as for example citric acid, do not produce useful compositions. In some embodiments, the compositions are free of inorganic compounds, or substantially free of inorganic compounds with less than about 5% by weight inorganic compounds, less than about 1% by weight inorganic compounds, or less than about 0.1% by weight inorganic compounds.

Although the technology herein has been described with reference to particular embodiments, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims. Accordingly, the scope of the present disclosure should be determined by the following claims and their appropriate legal equivalents.

Although the disclosure has been described with respect to certain features, it should be understood that the features and embodiments of the features can be combined with other features and embodiments of those features.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed throughout as from about one particular value, and to about another particular value. When such a range is expressed, it is to be understood that another embodiment is from the one particular value and to the other particular value, along with all combinations within said range.

As used throughout the disclosure and in the appended claims, the words "comprise," "has," and "include" and all grammatical variations thereof are each intended to have an open, non-limiting meaning that does not exclude additional elements or steps.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

While the disclosure has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present disclosure may suitably comprise, consist or consist essentially of the elements disclosed and may be practiced in the absence of an element not disclosed.

What is claimed is:

1. An organic lubricant composition formed by a mixture comprising:
   a. a castor oil, comprising at least 90% by weight of the mixture;
   b. glacial acetic acid, comprising at least 0.5% by weight of the mixture; and
   c. n-propanol, comprising 5% by weight of the mixture; where the organic lubricant composition comprises less than 5% by weight inorganic acid comprising phosphorus, and further where the lubricity of the organic lubricant as measured by a high frequency reciprocating rig and lubricity meter is improved at least between 8% to 10% versus the same mixture formed by combining a castor oil, n-propanol, and greater than 5% by weight inorganic acid comprising phosphorus instead of glacial acetic acid.

2. The composition of claim 1, further comprising an at least partially transesterified fatty acid ester wherein the components of the mixture react to form the at least partially-transesterified fatty acid ester.

3. The composition according to claim 1, where the organic lubricant composition comprises less than 0.5% by weight any inorganic compounds.

4. A method for use of the organic lubricant composition of claim 1 comprising the step of:
   applying the organic lubricant composition in a diesel fuel system at between about 50 ppm to about 500 ppm.

5. A method for use of the organic lubricant composition of claim 1 comprising the step of:
   applying the organic lubricant composition in a heating, ventilation, and air conditioning system.

6. A method for use of the organic lubricant composition of claim 1 comprising the step of:
   applying the organic lubricant composition in a wellbore drilling or production system.

7. A method for formulating an organic lubricant composition comprising the steps of:
   mixing together a castor oil; glacial acetic acid; and n-propanol to form a mixture, where the organic lubricant composition comprises less than 5% by weight of inorganic acid comprising phosphorus, where the castor oil comprises at least 90% by weight of the mixture, the glacial acetic acid comprises at least 0.5% by weight of the mixture, and the n-propanol comprises 5% by weight of the mixture; and allowing the mixture of the castor oil, the glacial acetic acid, and the n-propanol to react to form an at least partially-transesterified fatty acid ester, where the lubricity of the organic lubricant as measured by a high frequency reciprocating rig and lubricity meter is improved at least between 8% to 10% versus the same mixture formed by combining a castor oil, n-propanol, and greater than 5% by weight inorganic acid comprising phosphorus instead of glacial acetic acid.

8. The method according to claim 7, where the organic lubricant composition comprises less than 0.5% by weight any inorganic compounds.

9. The composition according to claim 1, where a concentration of an inorganic acid is less than about 5 ppm in the organic lubricant composition.

10. The composition according to claim 9, where the inorganic acid comprises phosphoric acid.

11. The method according to claim 7, where a concentration of an inorganic acid is less than about 5 ppm in the organic lubricant composition.

12. The method according to claim 11, where the inorganic acid comprises phosphoric acid.

13. The composition according to claim 1, where the total acid number of the organic lubricant composition is about 4 Mg KOH/gm.

14. The method according to claim 7, where the total acid number of the organic lubricant composition is about 4 Mg KOH/gm.

* * * * *